United States Patent
Shibutani

(10) Patent No.: US 7,515,813 B2
(45) Date of Patent: Apr. 7, 2009

(54) IMAGE AND AUDIO REPRODUCING APPARATUS CAPABLE OF REPRODUCING IMAGE DATA WITH AUDIO DATA INCLUDED

(75) Inventor: Atsushi Shibutani, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 867 days.

(21) Appl. No.: 10/648,860

(22) Filed: Aug. 25, 2003

(65) Prior Publication Data

US 2004/0041934 A1    Mar. 4, 2004

(30) Foreign Application Priority Data

Aug. 28, 2002    (JP) .............................. 2002-248339

(51) Int. Cl.
*H04N 5/91* (2006.01)
(52) U.S. Cl. ....................................... 386/96
(58) Field of Classification Search ................ 386/96, 386/95, 117, 120, 121
See application file for complete search history.

(56) References Cited

U.S. PATENT DOCUMENTS

| | | | |
|---|---|---|---|
| 4,965,675 A * | 10/1990 | Hori et al. | 386/101 |
| 5,379,084 A * | 1/1995 | Yamazaki | 396/78 |
| 6,052,510 A * | 4/2000 | Sakaegi et al. | 386/120 |
| 6,229,953 B1* | 5/2001 | Ejima et al. | 386/96 |
| 2001/0002142 A1* | 5/2001 | Akiyama et al. | 348/222 |
| 2001/0003464 A1* | 6/2001 | Niikawa | 348/341 |
| 2002/0021361 A1 | 2/2002 | Kitajima et al. | |
| 2002/0024604 A1 | 2/2002 | Ejima et al. | |
| 2002/0033889 A1 | 3/2002 | Miyazaki | |

FOREIGN PATENT DOCUMENTS

| | | |
|---|---|---|
| EP | 1 199 892 A1 | 4/2002 |
| JP | 06-022258 A | 1/1994 |
| JP | 2000-78516 A | 3/2000 |
| JP | 2001-069453 A | 3/2001 |
| JP | 2001-358980 A | 12/2001 |

OTHER PUBLICATIONS

Microsoft: "Excel: User's Guide" 1994, Microsoft Corporation, USA, XP002264681, Description "Bar Chart Type" p. 289, Description "Pie Chart Type" p. 292.
Aozara Knekyukai, Power point team, Power Point 2002 perfect master, Japan, Hideaki Makiya, Oct. 1, 2001, pp. 425 and 440.
Japanese Office Action (and English translation thereof) dated Jan. 24, 2006, issued in a counterpart Japanese Application.

* cited by examiner

*Primary Examiner*—Thai Tran
*Assistant Examiner*—Tat Chi Chio
(74) *Attorney, Agent, or Firm*—Frishauf, Holtz, Goodman & Chick, P.C.

(57) ABSTRACT

An image and audio reproducing apparatus comprises a display device, means for storing a picked-up image data, audio data which is generated before and at a pick-up timing of the image data and time data indicating the pick-up timing, means for reproducing the audio data, means for reproducing the image data to display an image on the display device, and means for controlling the image reproducing device based on the time data to inform the pick-up timing.

15 Claims, 11 Drawing Sheets

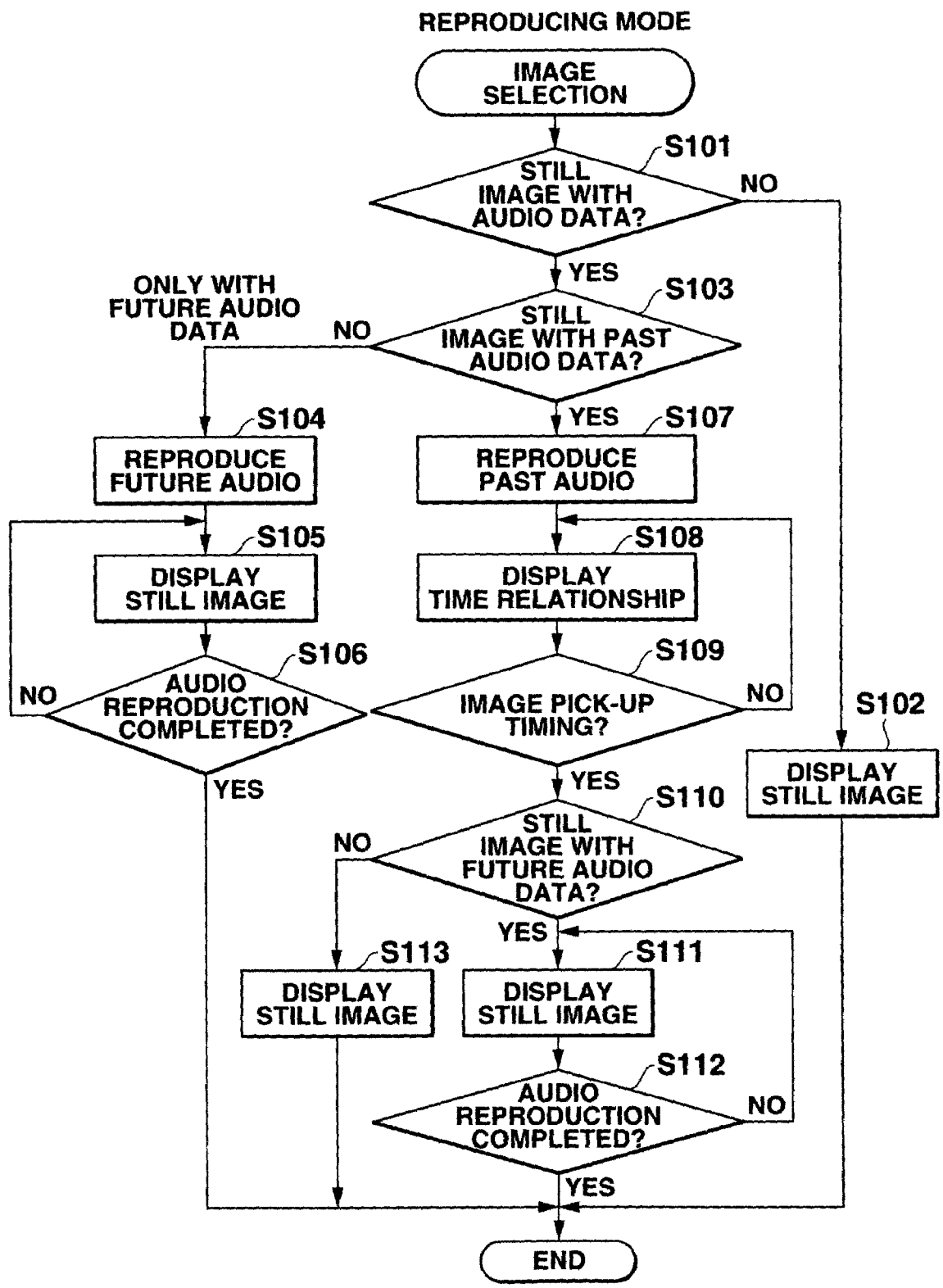

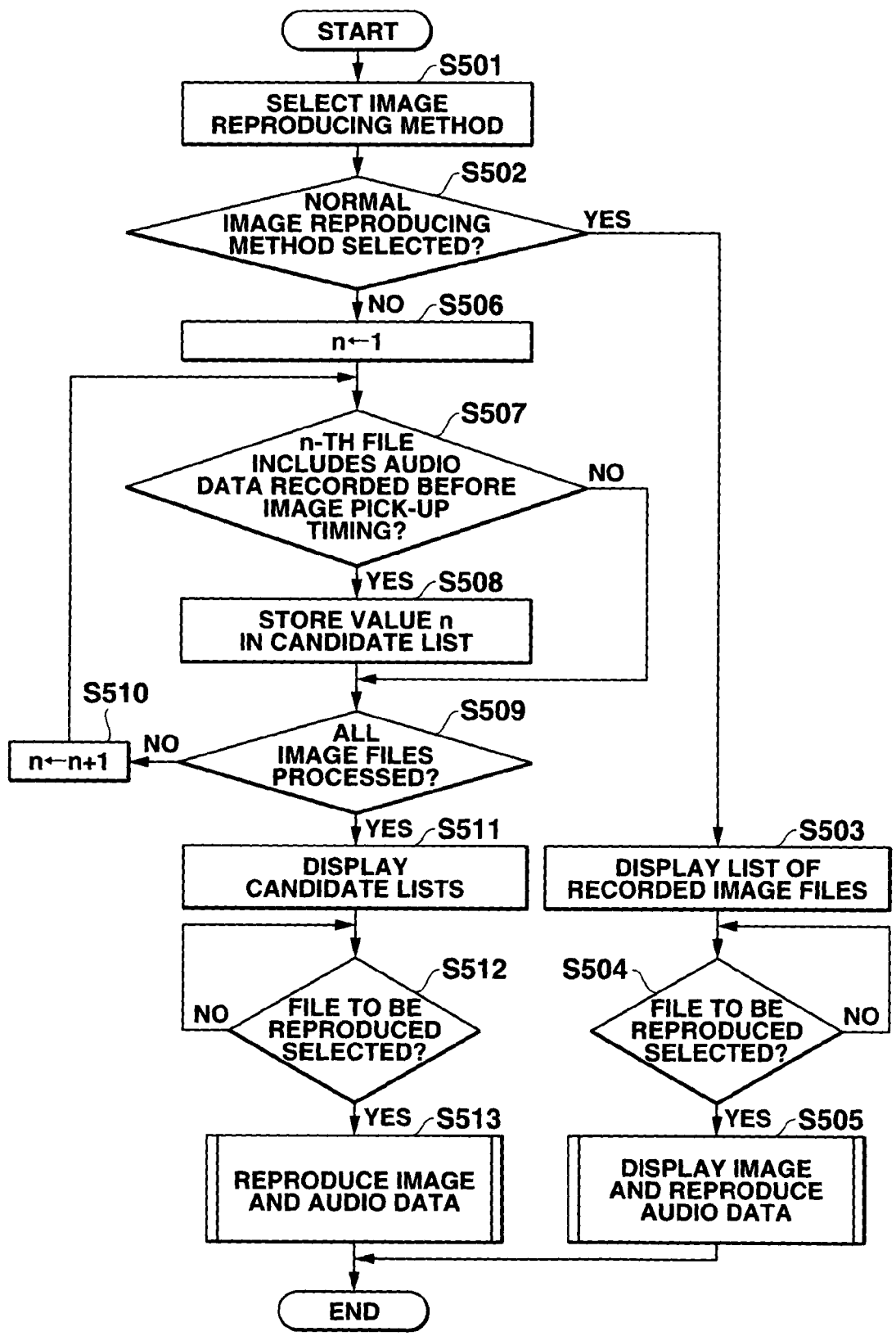

IMAGE AND AUDIO REPRODUCING APPARATUS CAPABLE OF REPRODUCING IMAGE DATA WITH AUDIO DATA INCLUDED

CROSS-REFERENCE TO RELATED APPLICATIONS

This application is based upon and claims the benefit of priority from the prior Japanese Patent Application No. 2002-248339, filed Aug. 28, 2002, the entire contents of which are incorporated herein by reference.

BACKGROUND OF THE INVENTION

1. Field of the Invention

The present invention relates to an image and audio reproducing apparatus, an image and audio reproducing method, and a program for reproducing a picked-up still image and an audio signal recorded together with the picked-up still image.

2. Description of the Related Art

In recent, a digital camera is proposed, which obtains and records a picked-up image in response to a shutter operation and further records audio sounds generated before and after the time when the image is picked-up. The digital camera that is ready for taking a picture detects and records surround sounds in an audio recording medium such as a ring buffer.

When a shutter button is operated, an image signal of a subject is obtained and the obtained image signal is associated with audio signal recorded on the audio recording medium, and is recorded in a storage medium. In a play back mode, the image signal recorded in the storage medium is reproduced to display the image of the subject, and at the same time the audio signal associated with the image signal is reproduced from a given recorded portion.

BRIEF SUMMARY OF THE INVENTION

The present invention is directed to method and apparatus that substantially obviates one or more of the problems due to limitations and disadvantages of the related art.

According to one aspect of the invention, an image and audio reproducing apparatus comprises:

a display device;

a storage device which stores a picked-up image data, audio data which is generated before and at a pick-up timing of the image data and time data indicating the pick-up timing;

an audio reproducing device which reproduces the audio data;

an image reproducing device which reproduces the image data to display an image on the display device; and a controller which controls the image reproducing device based on the time data to inform the pick-up timing.

According to another aspect of the invention, the controller controls the image reproducing device to display the image data when audio data which is generated at the pick-up timing is reproduced.

According to still another aspect of the invention, the controller controls the image reproducing device to display a relationship between a timing when the reproduced audio data is generated and the pick-up timing on the display device.

According to yet still another aspect of the invention, the controller controls the image reproducing device to display a relationship between a timing when the reproduced audio data is generated and the pick-up timing on the display device.

Further, according to an aspect of the invention, the controller controls the image reproducing device to change the image displayed on the display device when audio data which is generated at the pick-up timing is reproduced.

According to another aspect of the invention, the controller controls the image reproducing device to gradually change the image displayed on the display device until audio data which is generated at the pick-up timing is reproduced.

According to yet another aspect of the invention, the storage device further stores audio data which is generated after the pick-up timing, and the controller controls the audio reproducing device to reproduce the audio data after a time when the audio data which is generated at the pick-up timing is reproduced.

According to still another aspect of the invention, the storage device further stores audio data which is generated after the pick-up timing, and the controller controls the audio reproducing device to reproduce the audio data after a time when the audio data which is generated at the pick-up timing is reproduced, and to gradually change the image displayed on the display device after a time when the audio data which is generated at the pick-up timing is reproduced.

According to a further aspect of the invention, the image and audio reproducing apparatus further comprises a selector which selectively disables the controller, and wherein the controller controls the image reproducing device to display information indicating the pick-up timing on the display device when the selector does not disable the controller.

According to a yet still another aspect of the invention, the storage device stores plural sets of audio data and image data which are associated with each other, and the apparatus further comprises a first selector which selects one of sets of audio data and image data stored in the storage device, and wherein the audio reproducing device reproduces the audio data selected by the selector, and the image reproducing device reproduces the image data selected by the selector.

Further, according to another aspect of the invention, the image and audio reproducing apparatus further comprises a determining unit which determines whether the storage device stores audio data which is generated before and at the pick-up timing, and wherein the controller controls the image reproducing device to display information indicating the pick-up timing on the display device when the determining unit determines that the storage device stores audio data which is generated before and at the pick-up timing.

According to a still another aspect of the invention, the controller comprises a second selector which selects a set of audio data which is generated before and at the pick-up timing and image data and presents the selected set as a selection candidate for the first selector.

According to a yet still another aspect of the invention, the image and audio reproducing apparatus comprises a digital camera comprising a pick-up device which picks up an image to output the pick-up image data; and a recorder which records an audio sounds to output the audio data.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention in which:

FIG. 3 is a flow chart showing a procedure performed in a reproducing mode in a first embodiment.

FIG. 11 is a flow chart showing a procedure performed in a reproducing mode in a fifth embodiment.

DETAILED DESCRIPTION OF THE INVENTION

Embodiments of the invention will be described in detail with reference to the accompanying drawings.

First Embodiment

Figure 1:
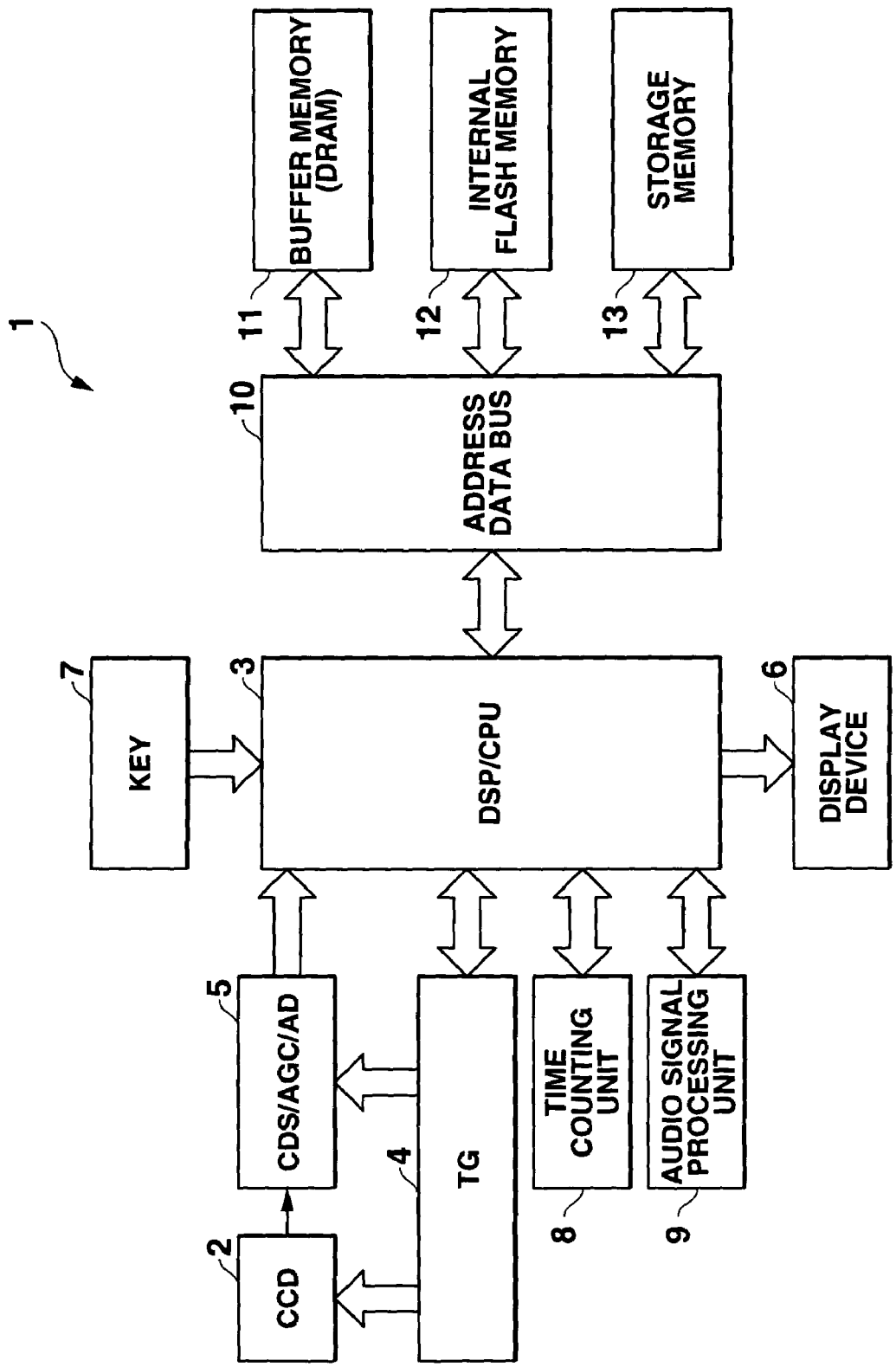
FIG. 1 is a block diagram illustrating a configuration of an electronic still camera used commonly in embodiments of the invention.

FIG. 1 is a block diagram illustrating a configuration of an electronic still camera 1, which will be used in every embodiment of the invention. The electronic still camera 1 has a recording mode and a reproducing mode, which may be alternatively selected, and comprises a CCD 2 and a DSP/CPU 3. The DSP/CPU 3 is made of one chip microcomputer for controlling various units in the electronic still camera 1, which microcomputer has various digital signal processing functions such as processes for compressing and/or expanding process image data and an audio data process.

The DSP/CPU 3 is connected with a timing signal generator (TG) 4 for driving the CCD 2, and the timing generator 4 is connected to a unit circuit 5, which receives a picked-up signal representing an optical image of a subject output from the CCD 2. The unit circuit 5 comprises a CDS for holding the received picked-up signal, a automatic gain control amplifier (AGC) for amplifying the picked-up signal, and an A/D converter (AD) for converting the amplified picked-up signal into a digital picked-up signal. An output signal, i.e., a digital signal from the CCD 2 is sent to the DSP/CPU 3 through the unit circuit 5.

The DSP/CPU 3 is connected with a display device 6, a key input unit 7, a time counting unit 8 and an audio signal processing unit 9, and further connected with a buffer memory (DRAM) 11, an internal flash memory 12 and a detachable storage memory 13 through an address data bus 10.

The buffer memory 11 serves as a buffer memory for temporarily storing digital image data of the subject, which is obtained by picking-up the subject with the CCD 2, and used as a ring buffer memory which stores audio signals in a circulating fashion, and also used as a working memory. The image data and the audio data temporarily stored in the buffer memory 11 are compressed or coded by the DSP/CPU 3, whereby an image file in a predetermined format such as JPEG format etc. is obtained and the thus obtained image file is recorded in the storage memory 13.

In the internal flash memory 12 are stored an operation program for the DSP/CPU 3 and various kinds of data used for controlling various units. The DSP/CPU 3 operates in accordance with the operation program to function as a control unit, a reproduction control unit, a display control unit, an audio control unit and an image control unit.

The display device 6 is used as the display unit of the present invention, and comprises a color liquid crystal display (color LCD) and its driving circuit. In a state ready for picking-up, the display device 6 displays as a through image an image of the subject picked-up and obtained with the CCD 2, and in a state for reproducing a recorded image, the display device 6 displays the recorded image which is read out form the storage memory 13 and expanded.

The key input unit 7 includes plural operation keys such as a shutter key, a power key, a menu key and a cross key, and outputs a key input signal to the DSP/CPU 3. The time counting unit 8 has a calendar function of counting a date and a watch function of counting a time, and generates and sends in need date data and time data to the DSP/CPU 3 in a state for taking a picture. The time counting unit 8 is also used as a timer.

The audio signal processing unit 9 comprises an internal microphone, an amplifier, an A/D converter and an internal speaker. The audio signal processing unit 9 converts an audio signal into a digital signal, which audio signal is obtained through the internal microphone when picked-up in a pick-up with audio mode, and sends the converted digital signal to the DSP/CPU 3. The audio data sent to the DSP/CPU 3 is involved in the image file and is stored in the storage memory 13. The audio data stored in the storage memory 13 is reproduced together with the corresponding image data of the image file, and is output through the internal speaker.

In the electronic still camera 1 with the configuration set forth above, when the pick-up with audio mode is set, an audio recording operation is continuously performed at all times and audio data that is obtained through the internal microphone in the audio signal processing unit 9 is converted into a digital signal and the digital audio signal is recorded in the buffer memory 11 such as a ring buffer.

When the shutter key is operated, a still image picking-up procedure starts to pick-up the subject with CCD 2 in order to obtain image data of the subject. The obtained image data of the subject is converted into digital image data and the digital image data is temporarily stored in the buffer memory 11. Using the audio data and image data temporarily stored in the buffer memory 11, an image file is created as shown in FIG. 2, and stored in the storage memory 13.

Figure 2:
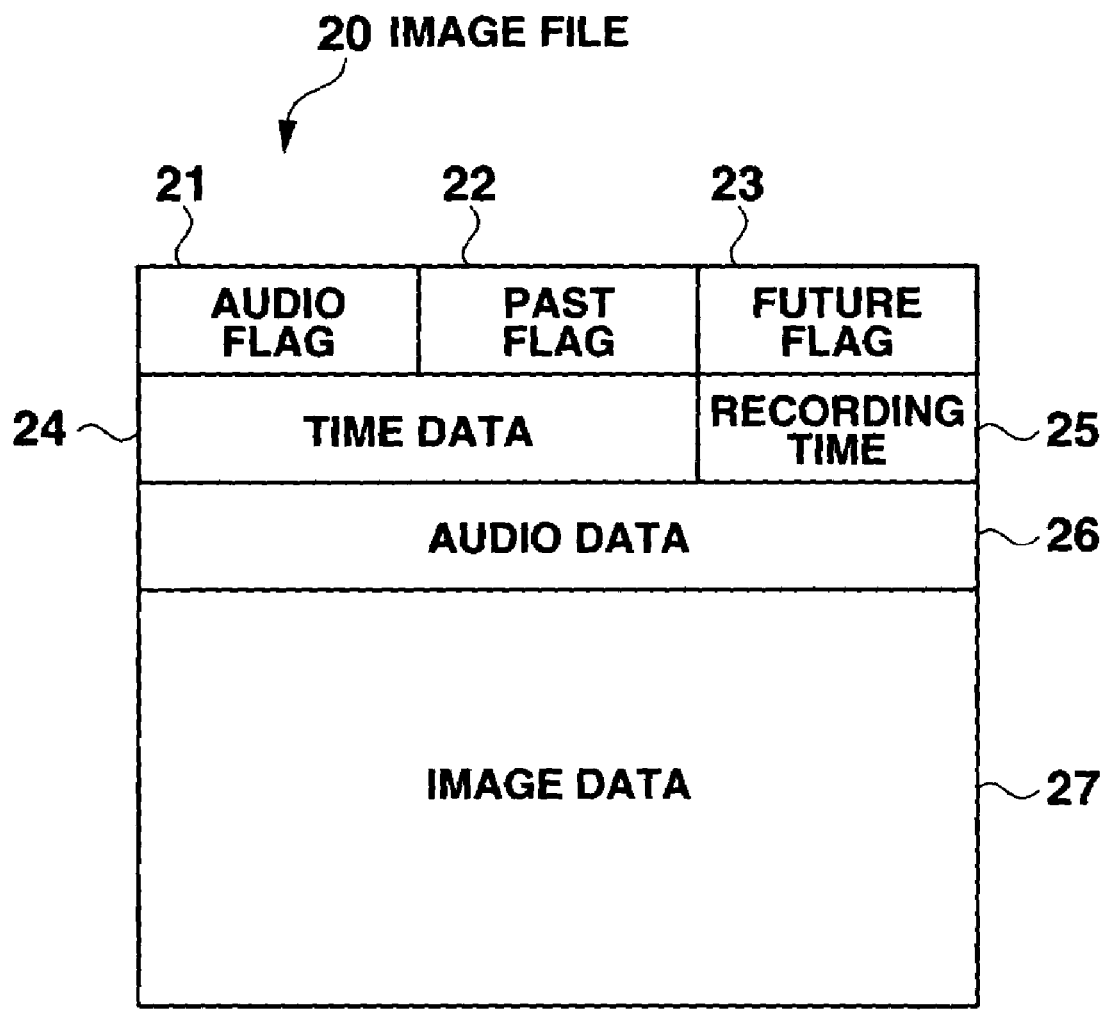
FIG. 2 is a view illustrating a configuration of an image file.

More specifically, FIG. 2 is a view illustrating an image file 20 with past audio data and future audio data added, which past audio data is obtained during a certain time period of several seconds before a picking-up timing at which the shutter key is operated, and which future audio data is obtained during a certain time period of several seconds after the picking-up timing. The image file 20 includes an audio flag 21, a past flag 22, a future flag 23, time data 24 representing a time duration between a time when the recording operation starts and a timing for picking-up a still image, a recording time 25, audio data 26 and image data 27.

The audio flag 21 shows whether or not the image file 20 is added with audio data. The past flag 22 shows whether or not the image file 20 is added with past audio data. The future flag 23 shows whether or not the image file 20 is added with future audio data.

The time data 24 representing a time duration between a time when the recording operation starts and a time of picking-up a still image is indicative of a recording time during which the past audio data is recorded, and the recording time 25 is indicative of a total recording time during which the past audio data and the future audio data are recorded. When only the past audio data is recorded, the recording time is not necessary and therefore is not recorded. The audio data 26 is a series of audio data including the past audio data and the future audio data. The image data 27 is still image data of the subject which is obtained at the shutter key operation and is temporarily stored in the storage memory 13. As set forth above, in the storage memory 13 is successively added and stored a new image file 20 every time the shutter key is operated.

When a reproducing mode is set, the DSP/CPU 3 scrolls the image files in response to operation of an up/down key to successively display image data included in the image files on the display device 6. When a user selects any one of the image data, the DSP/CPU 3 starts performing an image selecting procedure shown in FIG. 3.

More specifically, at step S101 it is determined based on the audio flag 21, whether or not the image file of the image data selected by the user is a still image file with audio data included. When the image file is not the still image file with audio data included but an image file including only the image data 27, a still image is reproduced and displayed on the display device 6 based on the image data 27 at step S102.

When it is determined at step S101 that the image file is the still image file with audio data included, it is determined based on the past flag 22 at step S103, whether or not the image file is the still image file with past audio data included. When it is determined at step S103 that the image file is not the still image file with past audio data included, then the image file is the still image file including only future audio data. When the image file is the still image file including only future audio data, an audio signal is reproduced from the future audio data 26 at step S104, and a still image is reproduced from the image data 27 and displayed on the display device 6 at step S105.

As a result, an audio sound is output from the internal speaker of the audio signal processing unit 9 based on the future audio data recorded during the certain time period after the time when the shutter key is operated, and at the same time an image picked-up at the time when the shutter key is operated is displayed on the display device 6. Then, it is determined at step S106, whether or not an audio reproducing operation based on the future audio data has been completed. The audio sound is continuously output based on the future audio data 26 until the audio reproducing operation finishes, and the image is also continuously displayed based on the image data 27. An image displaying operation finishes when the audio reproducing operation finishes.

Meanwhile, when it is determined at step S103 that the image file is the still image file with past audio data included, a past audio signal is reproduced from the beginning based on the audio data at step S107. In reproduction of the audio signal, the audio signal reproducing operation is performed such that a time duration required for the reproducing operation of the past audio signal will precisely correspond to time data 24 representing the time duration between a time when the recording operation starts and a timing for picking-up a still image. Then, a relationship between the time duration during which an audio signal has been reproduced and the timing for picking-up a still image is counted and displayed on the display device 6 at step S108.

Figure 4A:
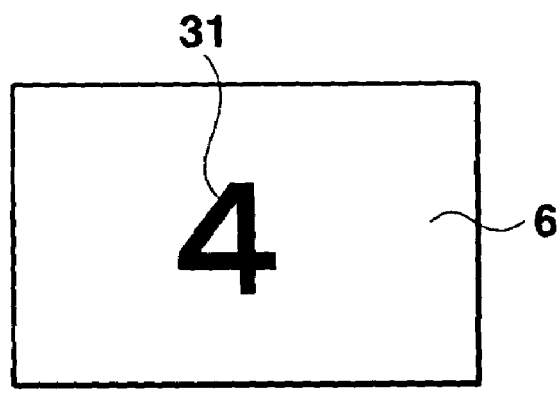
FIGS. 4A, 4B and 4C illustrate examples of a display screen on a display device in the first embodiment.

More specifically, the time data 24 included in the image file and representing the time duration between a time when the recording operation starts and a timing for taking a picture is displayed as the maximum time on the display device 6 at first, and then a numeral 31 representing the time data 24 is reduced as a time for the audio signal reproducing operation passes by as shown in FIG. 4A. Therefore, when the numeral 31 displayed on the still image has come to "0", the user can confirm that the timing has come for picking-up the still image that is currently displayed on the display device 6.

Figure 4B:
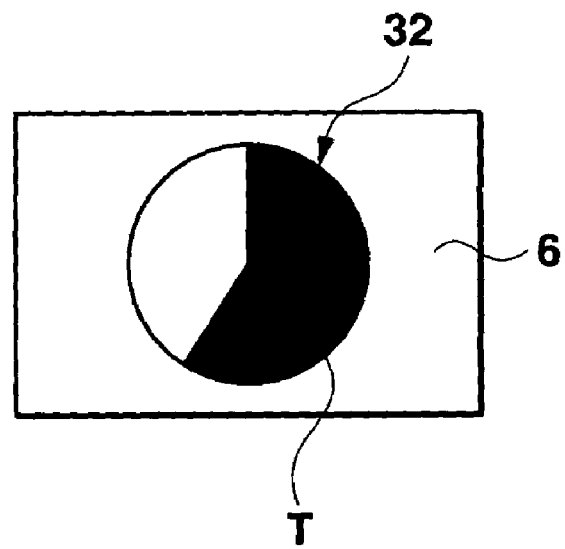

In another example, the time data 24 is displayed as 100% by a pie chart 32, and a time T lapsed from the beginning of the audio signal reproducing operation is indicated by the pie chart 32 as shown in FIG. 4B. The user can confirm that the lapsed time T shown in black in the pie chart 32 indicates the timing for picking-up the still image P that is currently displayed on the display device 6. Therefore, when the pie chart 32 is totally painted black, the user can confirm that the timing has come for picking-up the still image that is currently displayed on the display device 6.

Figure 4C:
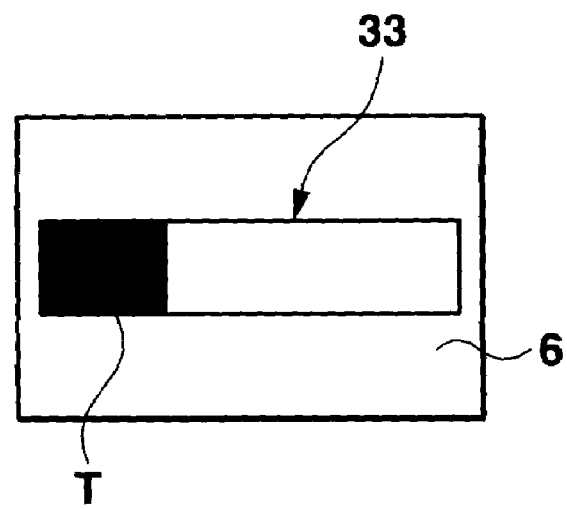

In a still another example, the time data 24 is displayed as 100% in a bar graph 33, and a time T lapsed from the beginning of the audio signal reproducing operation is indicated in the bar graph 33 as shown in FIG. 4C. The user can confirm that the lapsed time T shown in black in the bar graph 33 indicates the timing for picking-up the still image that is currently displayed on the display device 6. Therefore, when the bar graph 33 is totally painted black, the user can confirm that the timing has come for picking-up the still image P that is currently displayed on the display device 6.

At step S109 it is determined whether a timing corresponding to the timing for picking-up a still image has been reached or if the time duration 24 has been lapsed from a time when the past audio data starts to be reproduced in the audio signal reproduction. The above count down display is continued until the timing for picking-up a still image has been reached. When the timing for picking-up a still image has been reached, it is determined based on the future flag 23 at step S110, whether or not the image file is the still image file with future audio data included. When the image file is the still image file with future audio data included, a still image is reproduced based on the image data 27 included in the image data and is displayed on the display device 6 at step S111.

Therefore, when a still image with audio signal included is reproduced, the past audio signal, which has been recorded prior to the timing for taking a picture, is output from the internal speaker of the audio signal processing unit 9, and at the same time a still image picked-up at the timing for taking picture is displayed on the display device 6.

At step S112, it is determined whether or not the audio data reproducing operation for reproducing the audio data (future audio data) has finished. A sound is kept being output based on the audio data 26 and also an image is kept being displayed based on the image data 27 until the audio signal reproducing operation has finished. After the audio signal reproducing operation has finished, no sound is output and no image is displayed. Therefore, after the image picked-up at the timing for taking a picture is displayed on the display device 6, a sound is output from the internal speaker of the audio signal reproducing unit 9 based on the future audio data, which sound and image give the user the feeling of being at the scene for taking picture.

When it is determined at step S110 that the image file is not the still image file with future audio data included, a still image is reproduced and displayed on the display device 6 based on the image data 27 included in the image file 20 at step S113. Therefore, if only the past audio data is included in the recorded audio data, the still image picked-up at the timing for taking a picture appears on the display device at the same time when the audio reproducing operation of the past audio data has finished.

In the present embodiment, when the image file is the still image file with future audio data included (step S110; YES), the image is displayed after a timing corresponding to the timing for taking a picture has been reached, and is kept being displayed until the audio data reproducing operation for the future audio data has finished. But the embodiment may be modified so as to start reproducing and displaying the image only at the timing for taking a picture. Further, in the present embodiment, the remaining time is counted and displayed on the display device 6 at step S108, but the embodiment may be modified so as to suddenly display the still image at the time for taking a picture without displaying on the display device 6 the remaining time.

Second Embodiment

Figure 5:
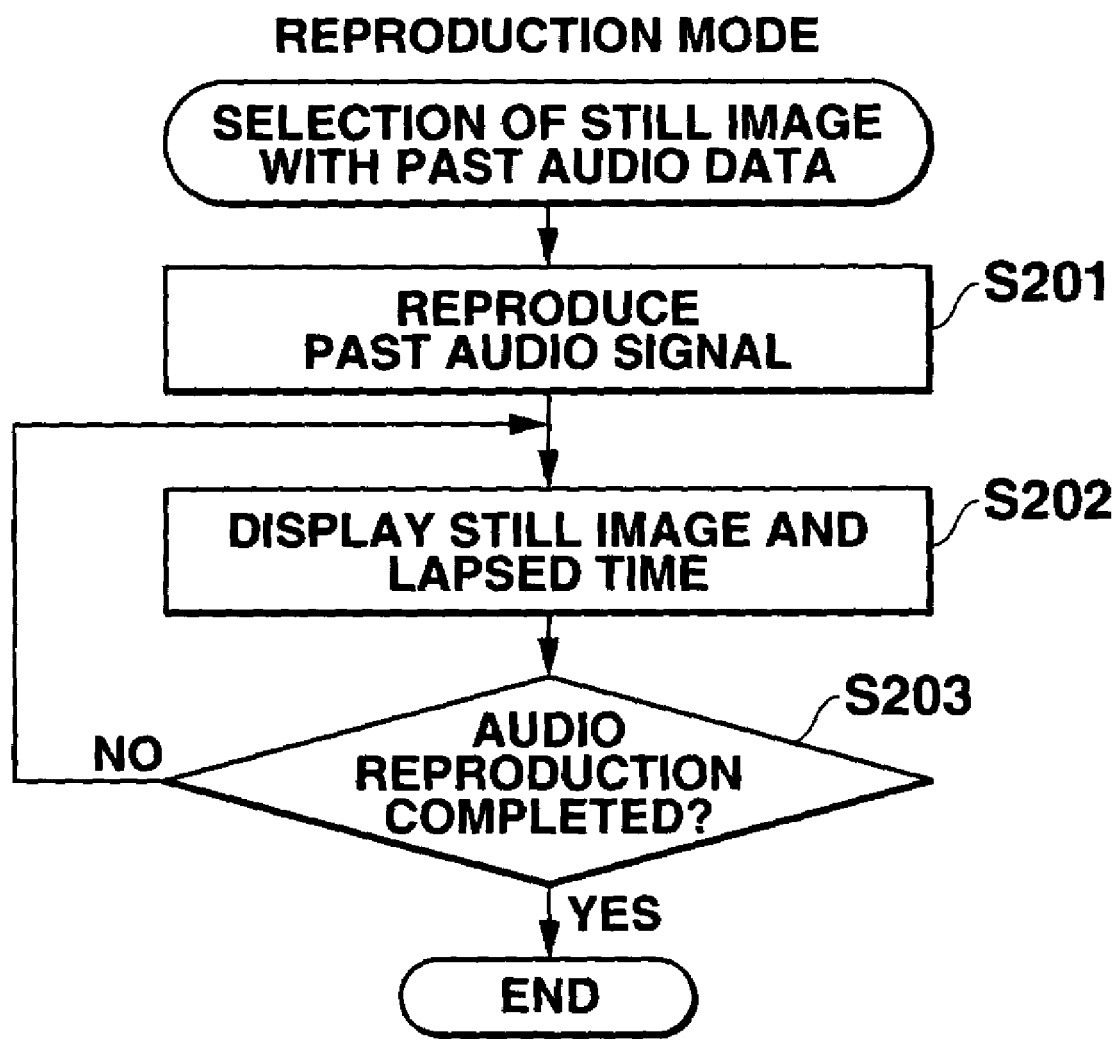
FIG. 5 is a flow chart showing a procedure performed in a reproducing mode in a second embodiment.

FIG. 5 is a flow chart showing a procedure performed by the DSP/CPU 3 in a second embodiment of the present invention. When the reproducing mode is set, image data included in each image file is scrolled and successively displayed on the display device 6 in response to operation of the up and down key. When the image data included in the image file with past audio data is selected on the display device 6 by the user, the image file including the selected image data is processed in accordance with the flow chart of FIG. 5.

At step S201, the past audio signal is reproduced from the beginning based on the audio data. The reproducing operation for the past audio data is performed in the same time duration as the time data 24 representing the time duration between a time when the recording operation starts and a timing for taking a picture.

A still image is displayed on the display device 6 based on the image data 27 included in the image file 20, and at the same time a relationship between the time duration during which the audio signal has been reproduced and the timing for picking-up a still image is counted down and displayed on the display device 6 at step S202.

Figure 6A:
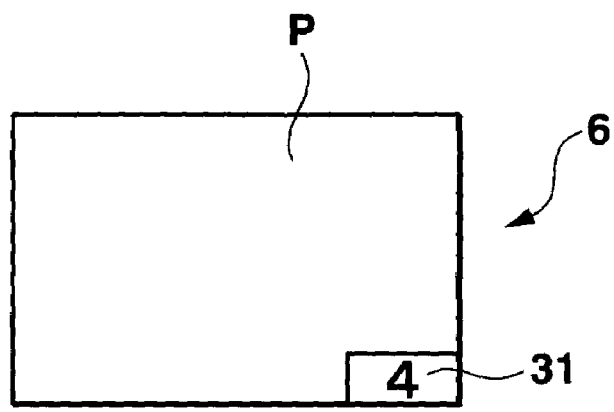
FIGS. 6A, 6B and 6C illustrate examples of a display screen on a display device in the second embodiment.

More specifically, as shown in FIG. 6A, a numeral (indicated by a numeral 31) representing the time duration 24 between a time when the recording operation starts and a timing for taking a picture is displayed at first on a part of the still image P displayed on the display device 6, and then the numeral is decreased and displayed as the reproducing time passes by. Therefore, when the numeral 31 displayed on the still image has come to "0", the user can confirm that the timing has come for picking-up the still image P that is currently displayed on the display device 6.

Figure 6B:
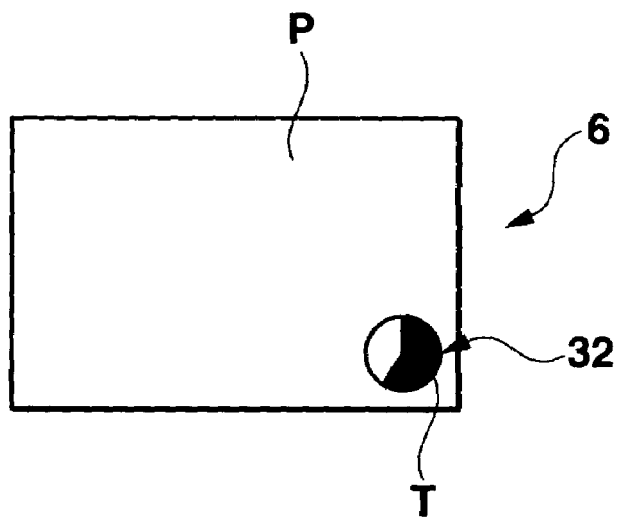

Further, as shown in FIG. 6B, the time duration 24 is displayed as 100% in a pie chart 32 on a part of the still image P displayed on the display device 6, and a time T lapsed from the beginning of the audio signal reproducing operation is indicated in the pie chart 32. The user can confirm that the lapsed time T shown in black in the pie chart 32 indicates the timing for picking-up the still image P that is currently displayed on the display device 6. Therefore, when the pie chart 32 is totally painted black, the user can confirm that the timing has come for picking-up the still image P that is currently displayed on the display device 6.

Figure 6C:
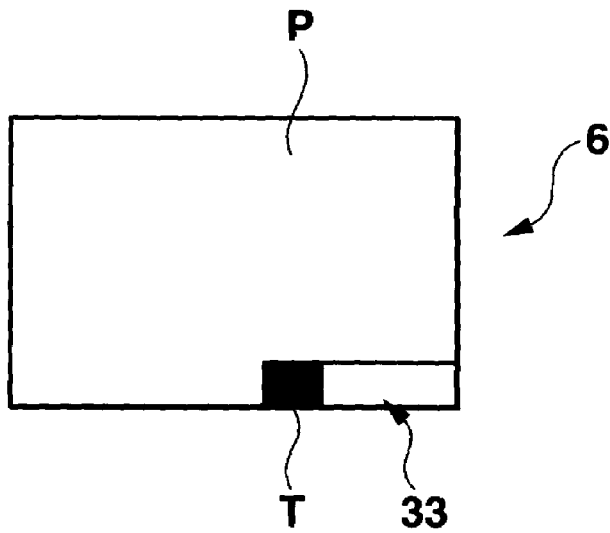

In an another example, the time duration 24 is displayed as 100% in a bar graph 33 displayed on a part of the still image P displayed on the display device 6, and a time T lapsed from the beginning of the audio signal reproducing operation is indicated in black in the bar graph 33 as shown in FIG. 6C. The user can confirm that the lapsed time T shown in black in the bar graph 33 indicates the timing for picking-up the still image P that is currently displayed on the display device 6. Therefore, when the bar graph 33 is totally painted black, the user can confirm that the timing has come for picking-up the still image P that is currently displayed on the display device 6.

It is determined at step S203 whether or not the audio signal reproducing operation based on the audio data 26 included in the image file 20 has finished. If not finished, a process at step 202 is repeatedly performed. If the future audio data is included in the image file 20, then a time is counted up from the beginning of the reproducing operation for the future audio data.

When the audio signal reproducing operation based on the audio data 26 included in the image file 20 finishes, then the procedure in accordance with the flow chart of FIG. 5 finishes.

Third Embodiment

Figure 7:
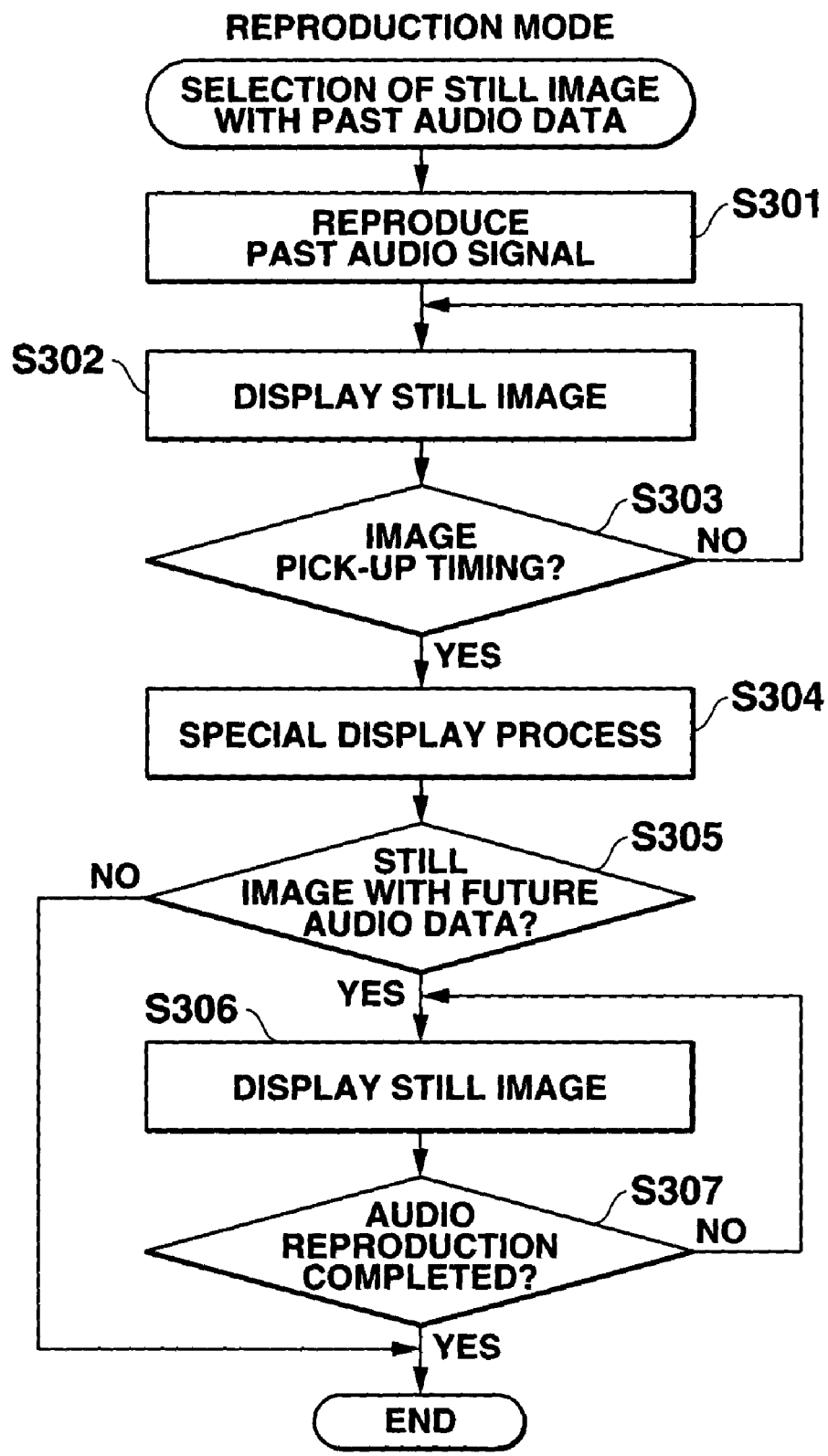
FIG. 7 is a flow chart showing a procedure performed in a reproducing mode in a third embodiment.

FIG. 7 is a flow chart showing a procedure performed by the DSP/CPU 3 in a third embodiment of the present invention. When the reproducing mode is set, image data included in each image file is scrolled and successively displayed on the display device 6 in response to operation of the up and down key. When the image data included in the image file with past audio data is selected on the display device 6 by the user, the image file with past audio data including the selected image data is processed in accordance with the flow chart of FIG. 7.

At step S301, the past audio signal is reproduced from the beginning based on the audio data. The reproducing operation for the past audio data is performed in the same time duration as the time data 24 representing the time duration between a time when the recording operation starts and a timing for taking a picture.

Figure 8A:
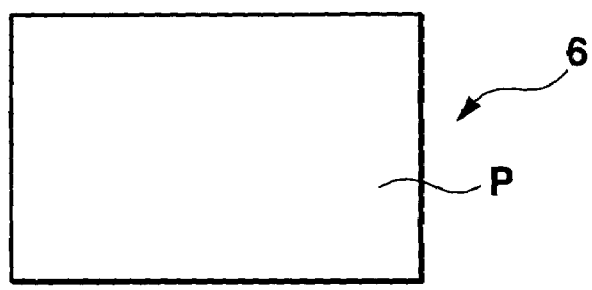
FIGS. 8A, 8B, 8C and 8D illustrate examples of a display screen on a display device in the third embodiment.

A still image is reproduced and displayed on the display device 6 based on the image data 27 included in the image file 20 at step S302. Then, the still image P is displayed on the display device 6 at step S302, as shown in FIG. 8A. It is determined at step S303 whether or not a timing corresponding to the timing for taking a picture has come, or whether or not the time duration 24 between a time when the recording operation starts and a timing for taking a picture has lapsed after the reproducing operation of the past audio data began. The still image is kept being displayed on the display device 6 until the timing for taking a picture has come and when the timing for taking the picture has come, a special displaying procedure is performed at step S304.

Figure 8B:
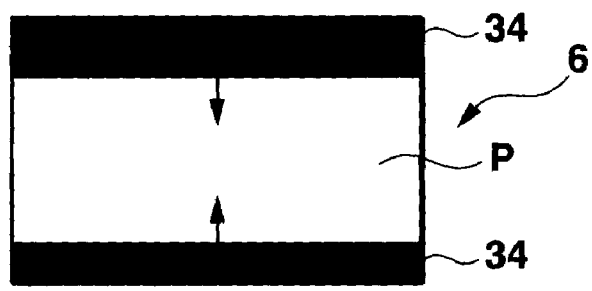
Figure 8C:
Figure 8D:
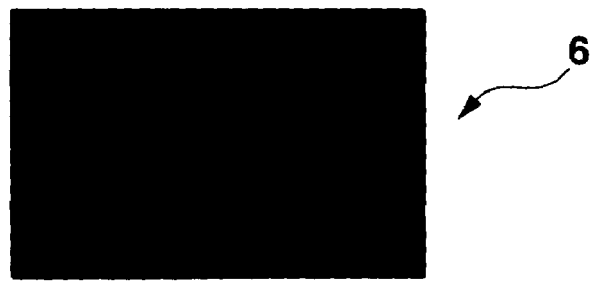

In the special displaying procedure, black portions 34 and 34 are displayed on the display device 6 at a top and a bottom side of its display screen with the still image P displayed on the display device 6 as shown in FIGS. 8A and 8B. Then the black portions grow towards a horizontal center line as shown in FIG. 8C. Finally, the whole display screen of the display device 6 turns black as if a shutter has been clicked, as shown in FIG. 8D to indicate that the timing for taking a picture has come.

The special displaying procedure is not limited those set forth above with reference to FIGS. 8A-8D, but any display, including an icon or a message, different from the still image P or a flashing display can be used if such display can clearly show that the timing for taking a picture has come.

At step S305, it is determined based on the future flag 23 whether or not the image file is the still image file with future audio data. When the image file is the still image file with future audio data included, a still image is displayed on the display device 6 based on the image data 27 included in the image file 20 at step S306. That is, the black display screen on the display device 6 shown in FIG. 8D turns or returns to the display of the still image P as shown in FIG. 8A.

Further, it is determined at step S307 whether the audio signal reproducing operation for the audio data (future audio data) has finished, and a sound is kept being output based on the audio data and an image is also kept being displayed based on the image data 27 until the audio signal reproducing operation for the audio data finishes. When it is determined at step S305 that the image file is not the still image file with future audio data included, then the present procedure finishes.

Fourth Embodiment

Figure 9:
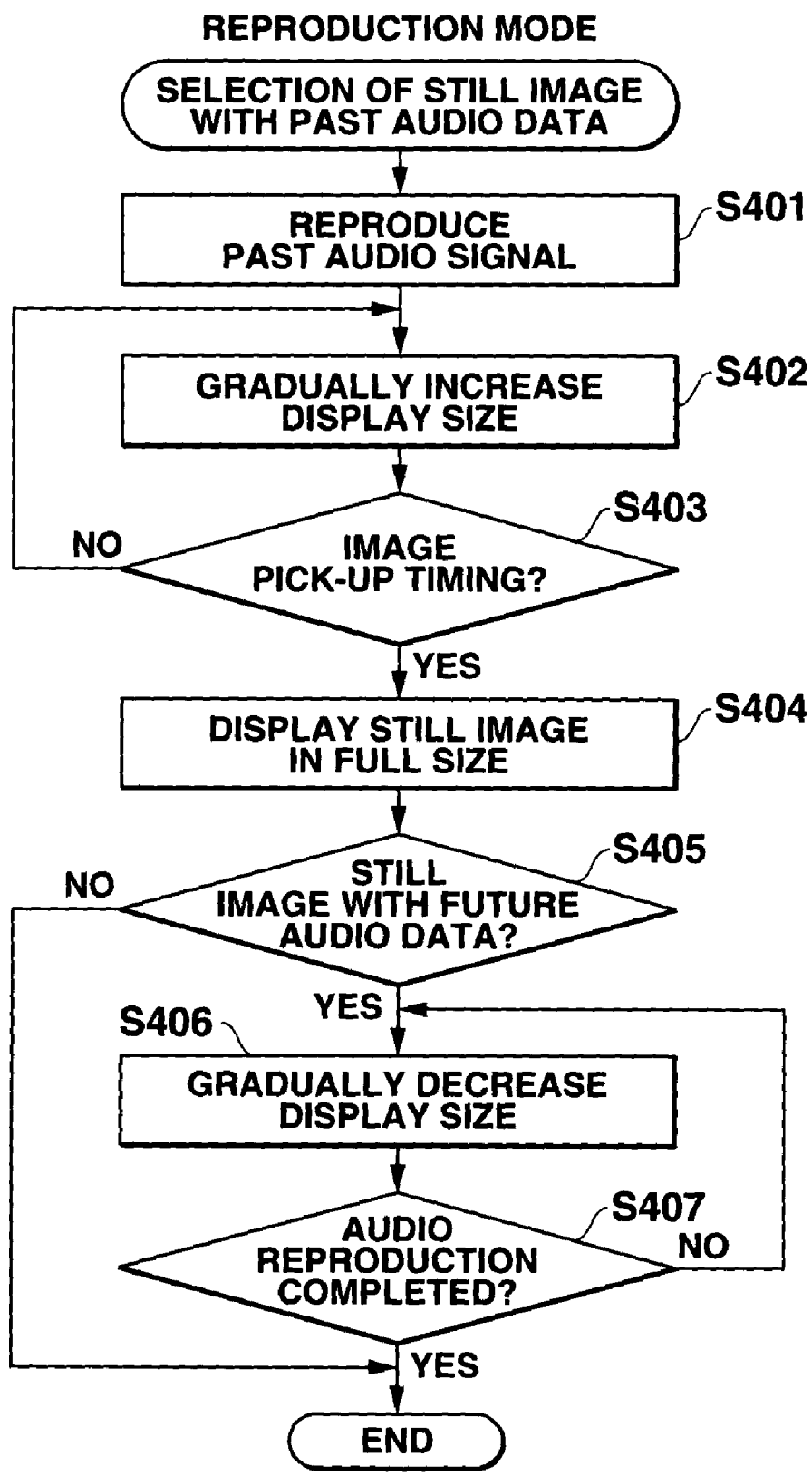
FIG. 9 is a flow chart showing a procedure performed in a reproducing mode in a fourth embodiment.

FIG. 9 is a flow chart showing a procedure performed by the DSP/CPU 3 in a fourth embodiment of the present invention. When the reproducing mode is set, image data included in each image file is scrolled and successively displayed on the display device 6 in response to operation of the up and down key. When the image data included in the image file with past audio data is selected on the display device 6 by the user, the image file with past audio data including the selected image data is processed in accordance with the flow chart of FIG. 9.

At step S401 in the flow chart of FIG. 9 the past audio signal is reproduced from the beginning based on the audio data. The reproducing operation for the past audio data is performed in the same time duration as the time data 24 representing the time duration between a time when the recording operation starts and a timing for taking a picture.

At step S401, further, a still image is reduced in size to a predetermined display size and displayed on the display device 6 based on the image data 27 included in the image file 20.

The reproduced still image is gradually enlarged in size and displayed on the display device 6 based on the image data 27 included in the image file 20 at step S402. In other words, the still image which is enlarged as a reproducing time of audio signal goes by is displayed on the display device 6. Then, it is determined at step S403 whether or not the timing for taking a picture has come or the time duration 24 between a time when the recording operation starts and a timing for taking a picture has lapsed after the reproducing operation of the past audio data began. The still image which is enlarged as a reproducing time of audio signal goes by is kept being displayed on the display device 6 until the timing for taking a picture has come, and the still image is displayed in a full size after the timing for taking a picture has come at step S404.

The procedure advances to a process at step S405, where it is determined based on the future flag 23 whether or not the image file is the still image file with future audio data included. When it is determined at step S405 that the image file is the still image file with future audio data included, the still image which has been displayed in a full size on the display device 6 is gradually reduced in size on the display device 6 at step S406.

Further, it is determined at step S407 whether or not the audio signal reproducing operation based on the audio data (future audio data at that time) has finished. A sound is kept being output based on the audio data 26 and a still image is kept being reduced in size and displayed on the display device 6 until the audio signal reproducing operation based on the audio data finishes. When the audio signal reproducing operation finishes, the displaying of the still image ceases, completing the procedure in the reproducing mode.

FIGS. 10A-10E illustrate the still images displayed on the display device 6, which are gradually enlarged and reduced in size at around the timing for taking a picture in the fourth embodiment.

Figure 10A:
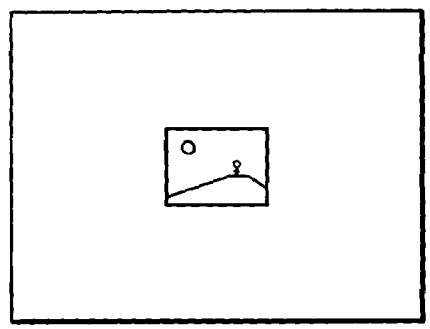
FIGS. 10A, 10B, 10C, 10D and 10E illustrate examples of a display screen on a display device in the fourth embodiment.
Figure 10B:
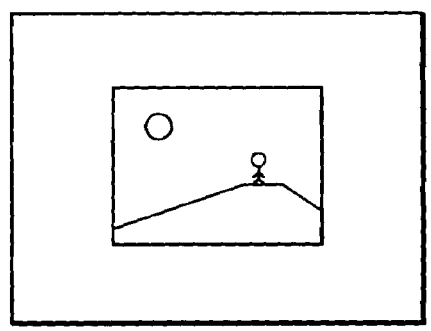
Figure 10C:
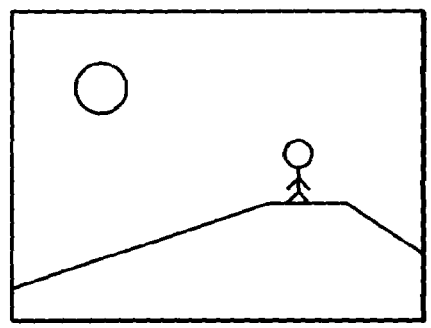

When the audio signal reproducing operation begins at step S401, a still image is displayed in a predetermined size on the display device 6 based on the image data 27 included in the image file 20 as shown in FIG. 10A. While the audio signal reproducing operation is being performed, the still image is gradually enlarged in a display size on the display device 6 as shown in FIG. 10B. When it is determined at step S403 that the audio signal reproducing operation is performed until a timing corresponding to the timing for taking a picture has come, the still image is displayed in a full size on the display device 6 as shown in FIG. 10C.

Figure 10D:
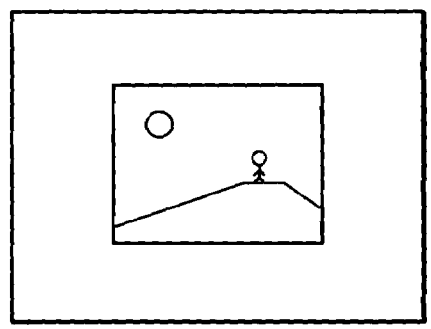
Figure 10E:
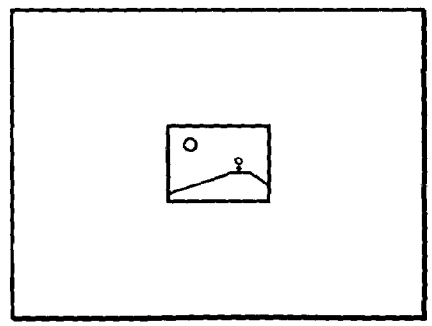

When the image file is the still image file with future audio data included, the still image is gradually reduced in a display size as shown in FIG. 10D while the audio signal reproducing operation is performed based on the future audio data included in the still image file. When the audio signal reproducing operation based on the future audio data finishes, the still image which is reduced in size as shown in FIG. 10E is displayed and the procedure finishes in the present embodiment.

To change the display size of the still image, for example the well known interpolating technique may be employed which thins out pixels, reducing number of pixels included in the still image.

Various manners may be proposed to enlarge or reduced at a given rate the display size of the still image to be displayed on the display device 6. For instance, in case that an initial display size of the still image is fixed when the audio signal reproducing operation begins, the display size of the still image may be enlarged at a constant rate using time data (representing the time duration between the time when the recording operation begins and the timing for taking a picture) included in the image file 20 so as to reach the maximum size at the time when the timing for taking a picture has come. In other words, a length of a side of the displayed still image may be increased at a certain rate, or an area of the displayed still image may be increased at a certain rate to indicate the timing for picking-up a still image is coming.

Further, the still image may be increased or reduced in size at a predetermined rate. In this case, the display size of the displayed still image is not necessarily increased to its maximum (FIG. 10C) during the time duration from the time when the recording operation begins to the timing of taking a picture. But, it is preferable to increase the display size of the still image before the timing for taking a picture comes and then to decrease the display size after the timing for taking a picture has come. On the contrary, the display size of the displayed still image can be increased to its maximum before the timing for taking a picture has come. In this case, the still image may be displayed in its maximum size until the timing for taking a picture comes.

In the fourth embodiment, the display device 6 begins to display the still image when the audio signal reproducing operation begins. But, the embodiment may be modified to display the still image in the increased or decreased size during the predetermined time period.

Further in the fourth embodiment, the still image which is gradually changed in its display size is displayed on the display device 6, but the embodiment may be modified to gradually increase sharpness in the still image before the timing for taking a picture comes and to decrease the sharpness when the timing for taking a picture has come, or to gradually change the displayed still image in color, for instance, from monochrome display to color display before the timing for taking a picture comes and to change from color display to monochrome display after the timing for taking a picture has come. Any modification may be employed which gradually changes the still image in its displayed state.

Fifth Embodiment

FIG. 11 is a flow chart showing a procedure performed by the DSP/CPU 3 in a fifth embodiment of the present invention.

In the present embodiment, the user selects an image reproducing method at step S501. That is, the user decides to reproduce an image signal and an audio signal according to the present invention or to reproduce in a normal way.

It is determined at step S502 that any one of reproducing methods is selected, an image and audio reproduction according to the present invention or a normal reproduction. When the normal reproduction is selected, a list of file names recorded in a recording medium is displayed on the display device 6 for the user's selection at steps S503 and S504. When the user selects one file for reproduction, image data and audio data included in the selected file (image file) are reproduced at step S505, and the procedure finishes (normal reproduction of the image file).

Meanwhile, when it is determined at step S502 that the image and audio reproduction according to the present invention is selected by the user, a counter "n" is set to "1" at step S506, and it is determined at step S507 whether or not n-th (first image file at this time) includes audio data which was recorded before the timing for taking a picture.

When it is determined at step S507 that first image file includes audio data which was recorded before the timing for taking a picture, the name of the image file or a value of the counter "n" is temporarily included and recorded in a candidate list at step S508 in order to be a candidate file as described later (step S511). The procedure advances to a process at step S509, where it is determined whether or not the determination at step S507 and the process at step 508 are performed with respect to all of the image files.

The counter "n" is incremented at step S510, and processes at step S507 through step S509 are repeatedly performed until all of the image files are successively determined whether or not they include audio data which was recorded before the timing for taking a picture.

When it is determined at step S509 that all of the image files have been determined whether or not they include the audio data, candidate files are read out from the candidate list and displayed for the user's selection at step S511, and the DSP/CPU 3 waits for the user's selection at step S512.

When the image file is selected by the user, the selected image file is subjected to the image and audio reproduction procedure of the present invention at step S513, and the procedure finishes.

The image and audio reproduction procedure to be performed at step S513 has been described in each of the above embodiments, and therefore further description will be omitted.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, in each embodiment, the image and the audio signal are reproduced from one and same image file 20 including the audio data 26 and the image data 27. In a modified embodiment, a file to be reproduced may be made in any recording format. For example, an audio file and an image file are made separately and are associated with each other to be recorded.

In the embodiments, the present invention has been described, which is used in the reproducing mode of the electronic still camera. But the present invention may be used with a reproducing function provided in a cellular phone with a built-in camera, PDA with a built-in camera, a notebook type personal computer with a built-in camera, and also used with a reproducing function provided in a cellular phone, PDA, a notebook type personal computer, which have no picking-up function. The present invention may be used with any apparatus which has a function of reproducing image and audio data.

The present invention has been described in detail with particular reference to certain preferred embodiments thereof, but it will be understood that variations and modifications can be effected within the spirit and scope of the invention.

What is claimed is:

1. An image and audio reproducing apparatus comprising:
a display device;
a storage device which stores a frame of image data, audio data which is generated before and at a pick-up timing of the frame of image data, and time data indicating the pick-up timing;
an audio reproducing device which reproduces the audio data;
an image reproducing device which reproduces the frame of image data to display an image of the frame of image data on the display device; and
a controller which controls the image reproducing device so that a display size of the image of the frame of image data gradually changes until the audio reproducing device reproduces the audio data generated at the pick-up timing;
wherein the controller controls the image reproducing device so that the image is displayed in a first predetermined display size when the audio reproducing device reproduces the audio data generated at the pick-up timing;
wherein the controller controls the image reproducing device so that the display size of the image of the frame of image data one of enlarges and reduces gradually toward the first predetermined display size until the audio reproducing device reproduces the audio data generated at the pick-up timing; and
wherein the controller controls the image reproducing device so that a proportion of the display size of the image of the frame of image data to the first predetermined display size depends on time remaining until the audio reproducing device reproduces the audio data generated at the pick-up timing.

2. The image and audio reproducing apparatus according to claim 1, wherein the controller controls the image reproducing device so that the display size changes gradually at a constant ratio until the audio reproducing device reproduces the audio data generated at the pick-up timing.

3. The image and audio reproducing apparatus according to claim 1, wherein the controller controls the image reproducing device so that the display size enlarges gradually until the audio reproducing device reproduces the audio data generated at the pick-up timing.

4. The image and audio reproducing apparatus according to claim 1, wherein the controller controls the image reproducing device so that the display size reduces gradually until the audio reproducing device reproduces the audio data generated at the pick-up timing.

5. The image and audio reproducing apparatus according to claim 1, wherein the storage device further stores audio data which is generated after the pick-up timing, and the controller controls the audio reproducing device to reproduce the audio data generated after the pick-up timing, after the audio data which is generated at the pick-up timing is reproduced.

6. The image and audio reproducing apparatus according to claim 1, wherein the storage device further stores audio data which is generated after the pick-up timing, and the controller controls the audio reproducing device so that the display size of the image one of enlarges and reduces gradually until the audio reproducing device reproduces the audio data generated at the pick-up timing, and the other of reduces and enlarges gradually after the audio reproducing device reproduces the audio data generated at the pick-up timing.

7. The image and audio reproducing apparatus according to claim 1, further comprising:
   a selector which selectively disables the controller, and wherein the controller controls the image reproducing device to display information indicating the pick-up timing on the display device when the selector does not disable the controller.

8. The image and audio reproducing apparatus according to claim 1, wherein the storage device stores plural sets of a frame of image data and audio data which are associated with each other, and the apparatus further comprises:
   a first selector which selects one of the plural sets stored in the storage device, and wherein the audio reproducing device reproduces the audio data of the selected set, and the image reproducing device reproduces the frame of image data of the selected set.

9. The image and audio reproducing apparatus according to claim 8, further comprising:
   a determining unit which determines whether the storage device stores audio data which is generated before and at the pick-up timing, and wherein the controller controls the image reproducing device to display information indicating the pick-up timing on the display device when the determining unit determines that the storage device stores the audio data which is generated before and at the pick-up timing.

10. The image and audio reproducing apparatus according to claim 8, wherein the controller comprises a second selector which selects a set of audio data which is generated before and at the pick-up timing and a frame of image data and presents the selected set as a selection candidate for the first selector.

11. The image and audio reproducing apparatus according to claim 1, wherein the image and audio reproducing apparatus comprises a digital camera comprising:
   a pick-up device which produces the frame of image data; and
   a recorder which produces the audio data.

12. The image and audio reproducing apparatus according to claim 1, wherein the controller controls the image reproducing device so that a display area of the display device on which the image of the frame of image data is displayed gradually changes until the audio reproducing device reproduces the audio data generated at the pick-up timing.

13. The image and audio reproducing apparatus according to claim 1, wherein the image reproducing device generates the image of the frame of image data to be displayed by changing a number of pixels in the frame of image data in accordance with a designated display size.

14. A computer-readable medium having stored thereon a program for controlling a computer to perform functions comprising:
   reading a frame of image data, audio data which is generated before and at a pick-up timing of the frame of image data, and time data indicating the pick-up timing from a storage means;
   reproducing the audio data;
   reproducing the frame of image data to display an image of the frame of image data on a display device; and
   controlling the reproducing of the frame of image data so that a display size of the image of the frame of image data gradually changes until audio data generated at the pick-up timing is reproduced;
   wherein the reproducing of the frame of image data is controlled so that: the image is displayed in a first predetermined display size when the audio data generated at the pick-up timing is reproduced, the display size of the image of the frame of image data one of enlarges and reduces gradually toward the first predetermined display size until the audio data generated at the pick-up timing is reproduced, and a proportion of the display size of the image of the frame of image data to the first predetermined display size depends on time remaining until the audio data generated at the pick-up timing is reproduced.

15. An image and audio reproducing method comprising:
   reading a frame of image data, audio data which is generated before and at a pick-up timing of the frame of image data, and time data indicating the pick-up timing from a storage means;
   reproducing the audio data;
   reproducing the frame of image data to display an image of the frame of image data on a display device; and
   controlling the reproducing of the frame of image data so that a display size of the image of the frame of image data gradually changes until audio data generated at the pick-up timing is reproduced;
   wherein the reproducing of the frame of image data is controlled so that: the image is displayed in a first predetermined display size when the audio data generated at the pick-up timing is reproduced, the display size of the image of the frame of image data one of enlarges and reduces gradually toward the first predetermined display size until the audio data generated at the pick-up timing is reproduced, and a proportion of the display size of the image of the frame of image data to the first predetermined display size depends on time remaining until the audio data generated at the pick-up timing is reproduced.

* * * * *